United States Patent [19]
von Voros

[11] 4,035,922
[45] July 19, 1977

[54] DIGITAL ELECTRO-OPTICAL MICROMETER AND GAGES
[75] Inventor: Geza von Voros, Glen Rock, N.J.
[73] Assignee: Optograms, Inc., Oakland, N.J.
[21] Appl. No.: 675,597
[22] Filed: Apr. 9, 1976

Related U.S. Application Data
[63] Continuation-in-part of Ser. No. 496,325, Aug. 9, 1974, abandoned, which is a continuation-in-part of Ser. No. 229,944, Feb. 28, 1972, abandoned.

[51] Int. Cl.² .......................... G01B 7/02; G01B 19/36
[52] U.S. Cl. ................................ 33/143 L; 33/125 C; 33/147 N; 33/DIG. 3
[58] Field of Search ................. 33/125 A, 125 C, 129, 33/141 F, 141.5, 143 L, 143 K, 143 M, 147 N, 172 E, DIG. 3

[56] References Cited
U.S. PATENT DOCUMENTS

| | | | |
|---|---|---|---|
| 2,788,519 | 4/1957 | Caldwell | 340/271 |
| 3,271,564 | 9/1966 | Rosenfeld et al. | 33/140 |
| 3,638,220 | 1/1972 | Malina et al. | 33/129 |
| 3,658,429 | 4/1972 | Zipin | 33/125 A |
| 3,979,835 | 9/1976 | Sumption et al. | 33/172 E |

Primary Examiner—Richard E. Aegerter
Assistant Examiner—Richard R. Stearns
Attorney, Agent, or Firm—Ralph R. Roberts

[57] ABSTRACT

This invention pertains to an electro-optical digital precision micrometer and gages wherein one embodiment utilizes a tape carried in a frame and moved with the movable anvil portion of the apparatus. This tape is directed to and around a precision gage roller which carries a radially inscribed interrupter disc, wherein the lines on the disc cut a ray of light provided by a light source. This interruption of the ray of light is read by photosensors with the resulting pulses being converted into electrical signals which are fed to a digital counter and readout. In another embodiment the tape is carried and is moved with the movement of the movable anvil whose support also carries the precision roller whereby as the anvil is moved the tape is also moved at twice the rate of travel of the movable anvil. A dash pot system is provided in all systems so as to govern or regulate the speed of movement of the movable anvil and associated interrupter disc so that as the lines thereon cut the beam of light each line interruption is positively detected by the associated photosensor.

12 Claims, 22 Drawing Figures

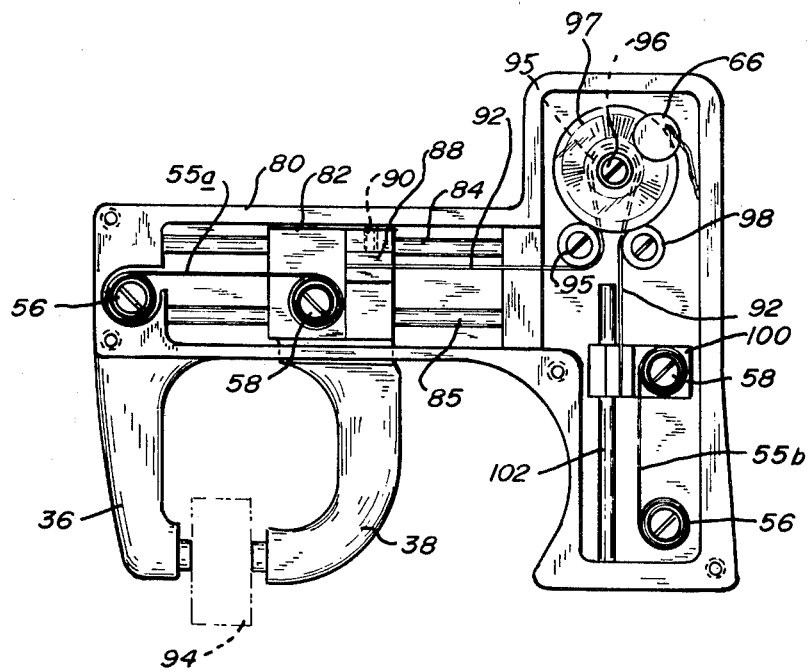
Fig_2
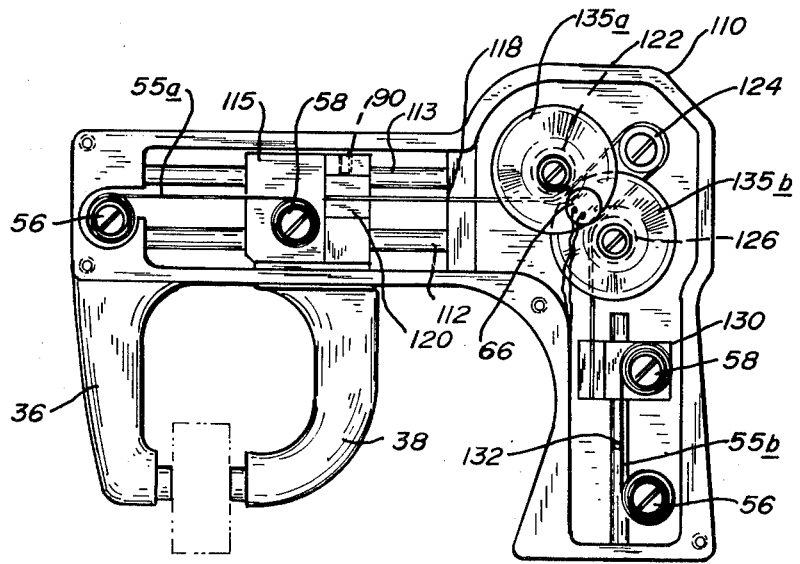
Fig_3

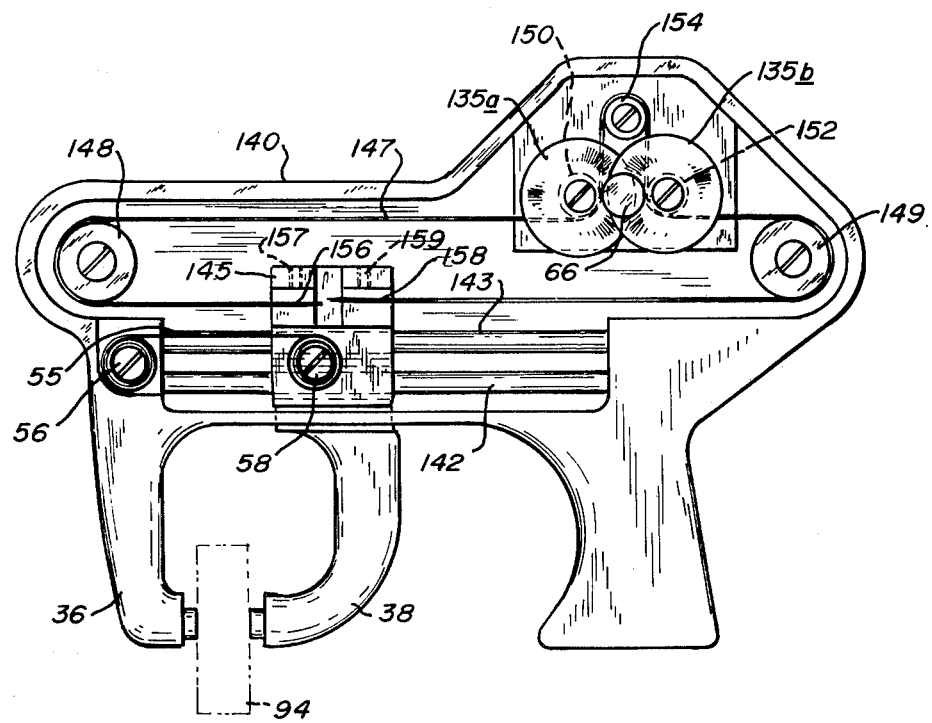
Fig_4
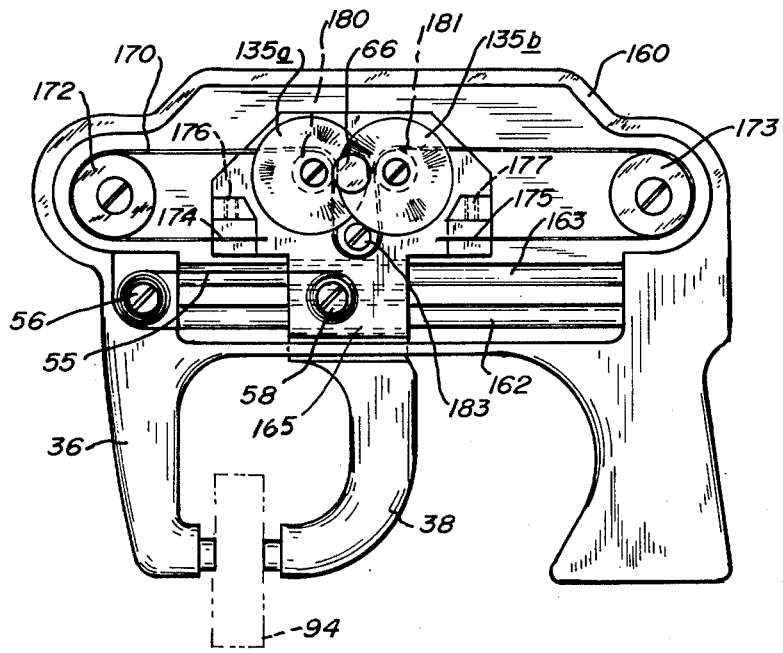
Fig_5

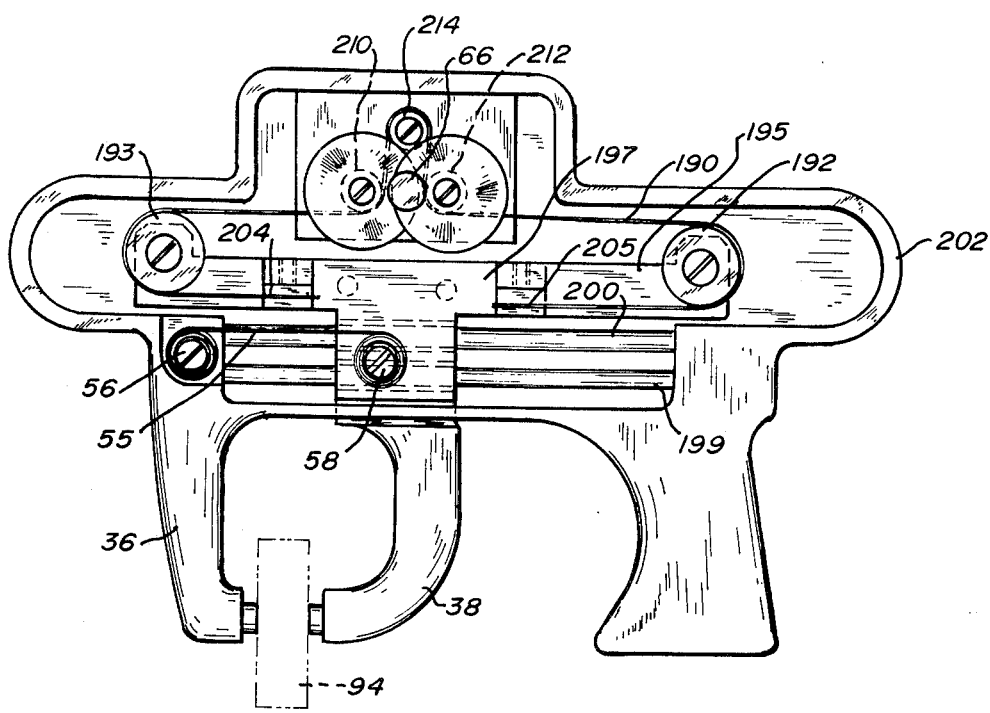
Fig_6
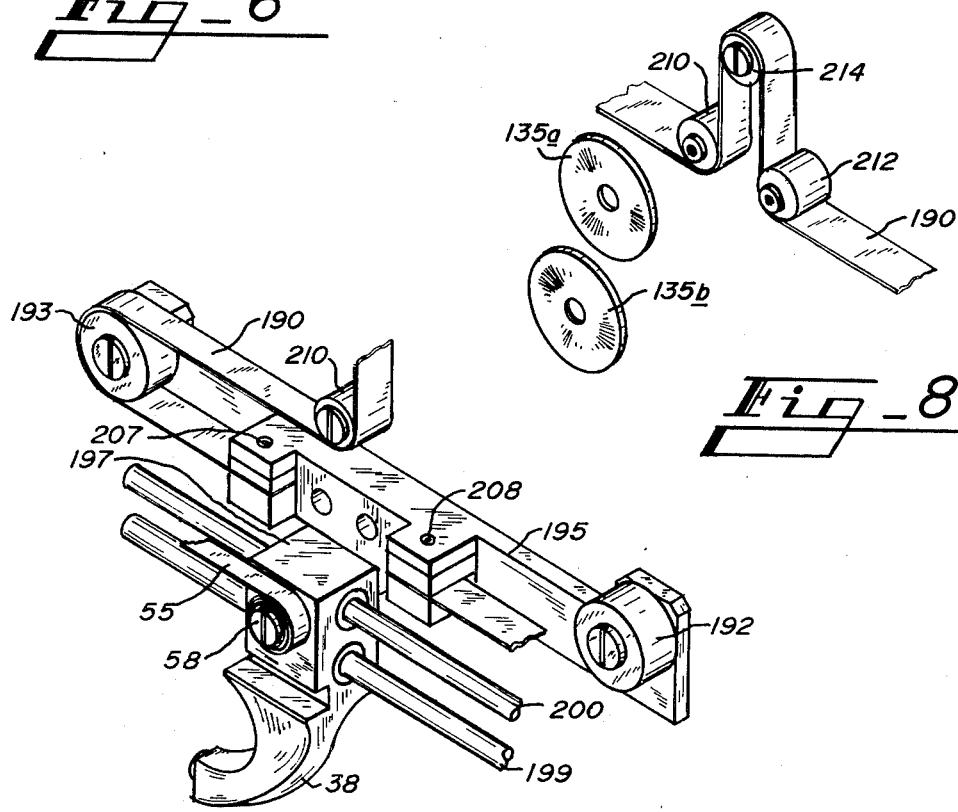
Fig_8
Fig_7

U.S. Patent July 19, 1977 Sheet 5 of 8 4,035,922
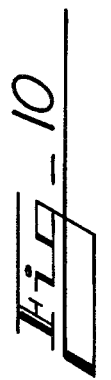
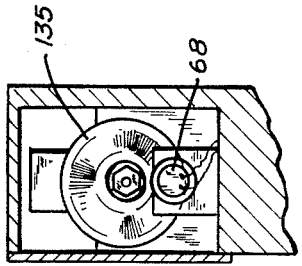
Fig-10
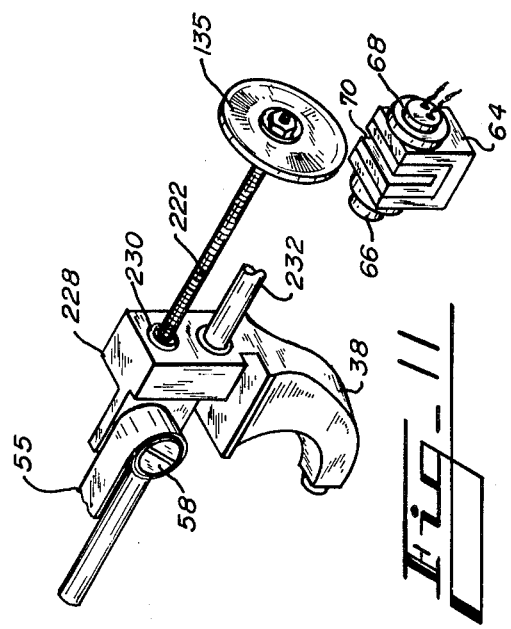
Fig-11
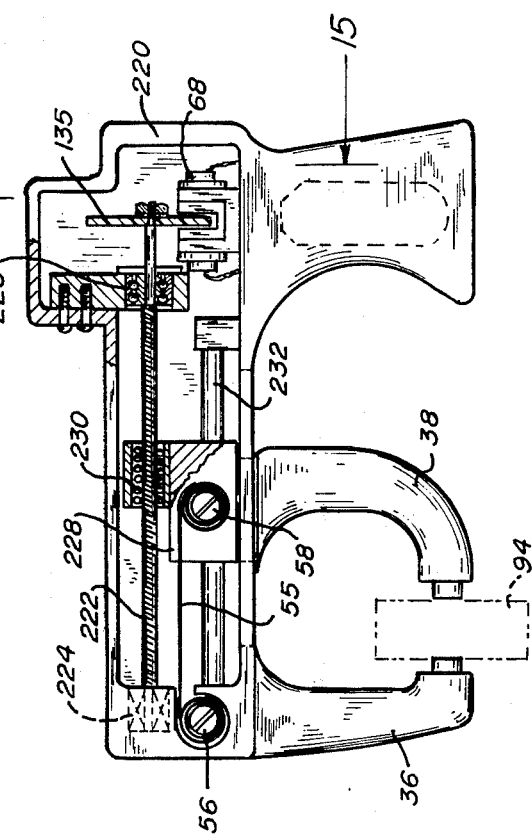
Fig-9
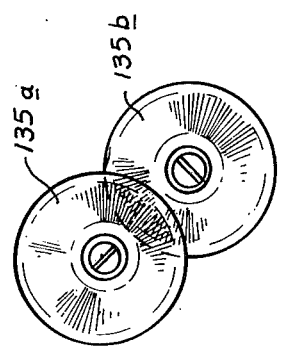
Fig-12

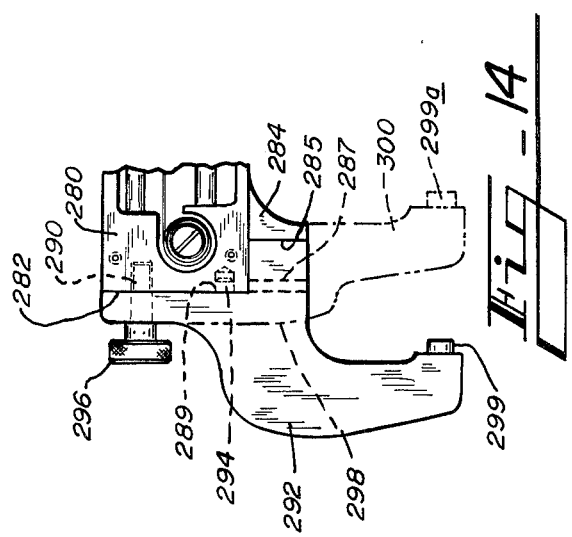
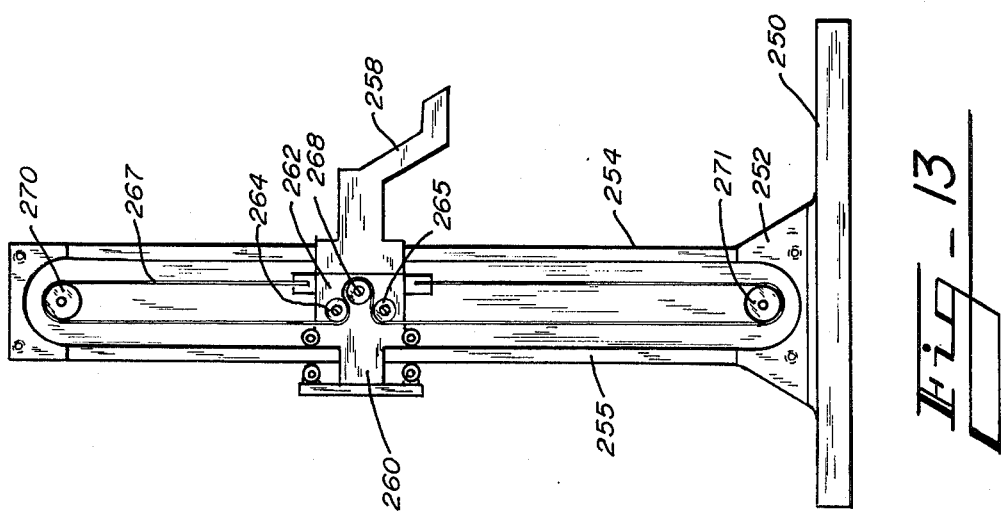

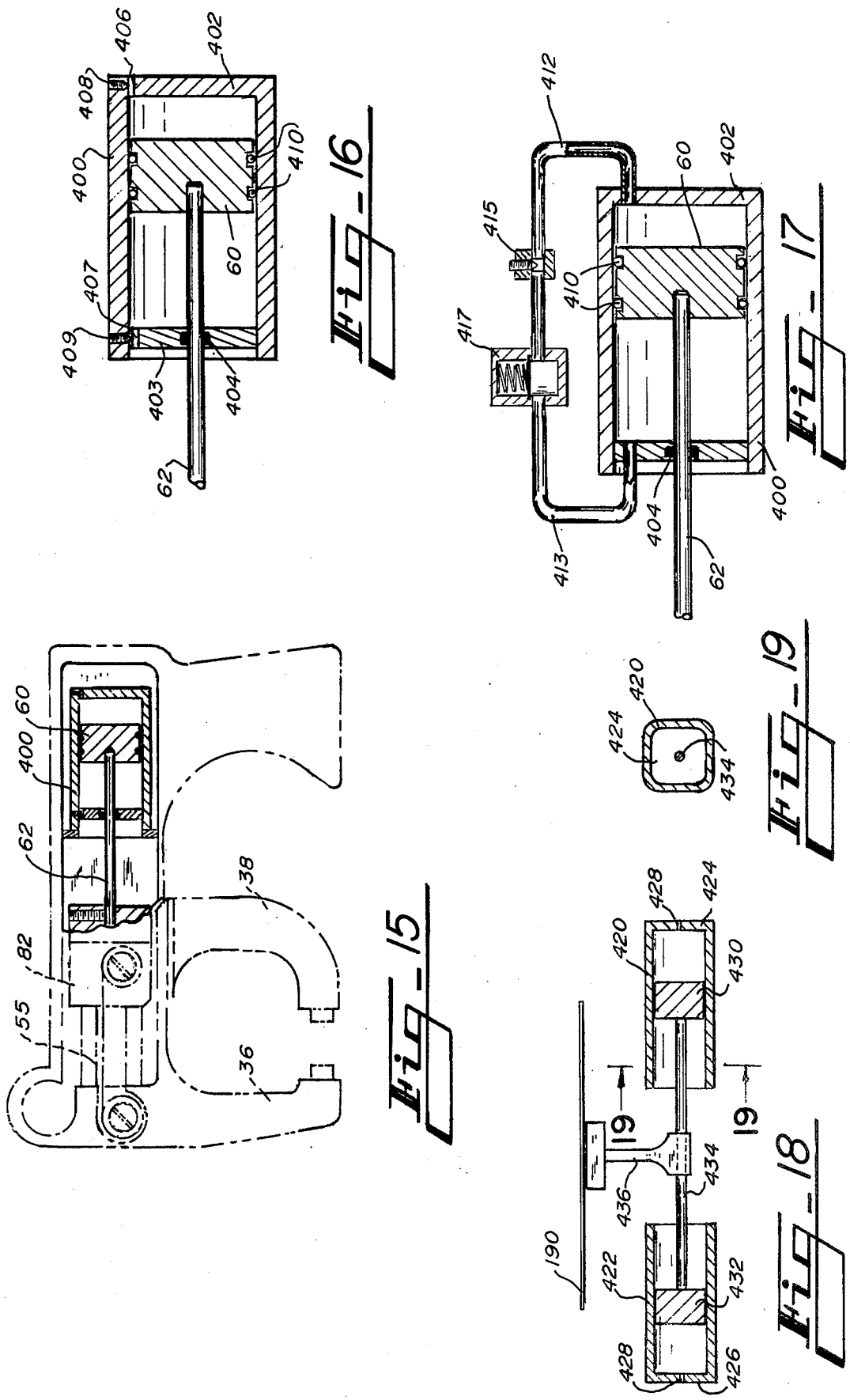

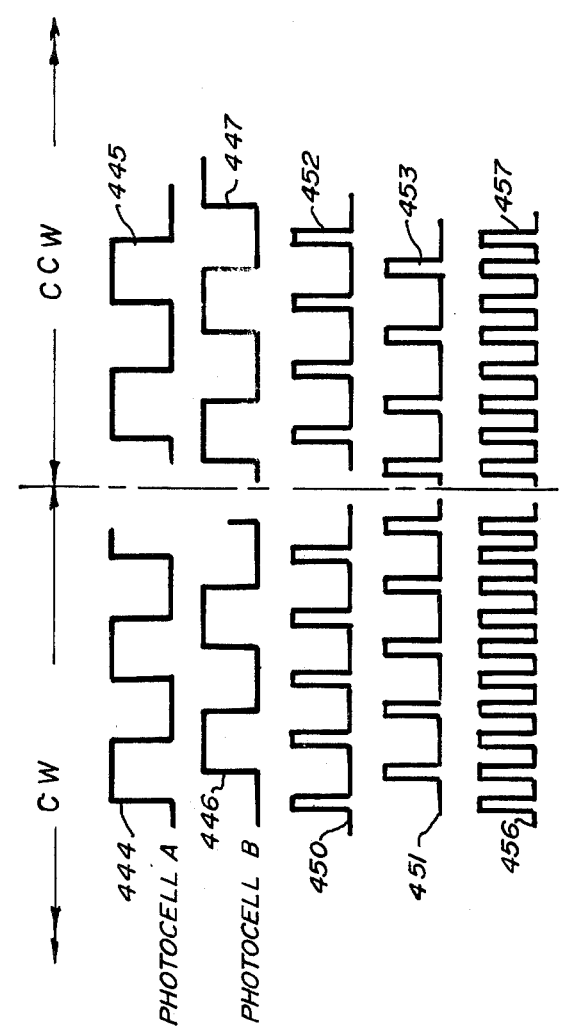
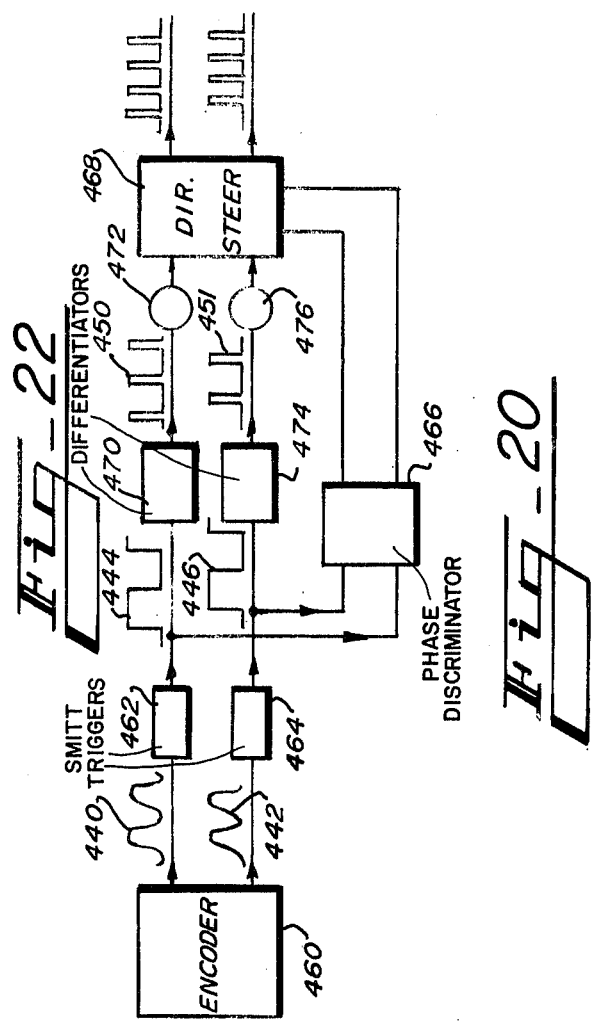
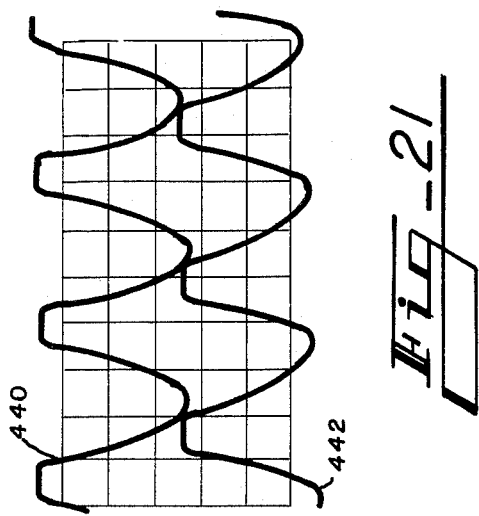

DIGITAL ELECTRO-OPTICAL MICROMETER AND GAGES

This is a Continuation-in-Part of my Continuation-in-Part application, Ser. No. 496,325 filed Aug. 9, 1974, now abandoned. Application Ser. No. 496,325 derived from application Ser. No. 229,944 filed Feb. 28, 1972 and now abandoned.

BACKGROUND OF THE INVENTION

1. Field of the Invention

With reference to the classification of art as established in the United States Patent & Trademark Office the field of art to which this invention pertains is found in the general Class of "Geometrical Instruments" (Class 33) and more particularly in the subclass of "distance measuring" (subclass 125 R). Also of note is the art in the further subclass of "opposed contacts" (subclass 143 R).

2. Description of the Prior Art

Micrometers which utilize a precision ground lead screw running in a precision nut are well known. In these devices the rotary motion of the barrel is read upon a scale inscribed upon the rotary anvil or a shell carried thereby. These micrometers, of course, are well known and for many years have been a standard in machine shops for use in measuring workpieces. Micrometers, having heads with optical rotary encoders attached to the lead screw, and with displayed readout, have been brought to the market in the past few years. Vernier calipers and height gages using precision-engraved scales are also well known and are particularly useful in making measurements of relatively long distances such as for measuring from zero to 12 inches or from zero to other units of a longer length. In the use of micrometers having a precision lead screw there have been many attempts and patents directed toward controlling the advancement of the lead screw to provide a determined amount of drive friction so that neither an excessive squeeze nor too light an engagement or grip on the object to be measured is provided in the use of the micrometer. It is well known, for example, that different inspectors well skilled in the use of a lead-screw type of micrometer and using the same micrometer under the same conditions may vary as much as two or three ten-thousandths of an inch in reading measurements for the same workpiece. This variation, of course, occurs because of the hand manipulation provided by the inspector himself.

In the same manner the use of a vernier caliper and its precision scale depends upon the accuracy of the scale as well as the skill of the inspector in setting the jaws of the vernier caliper. In addition to the requirements of physical dexterity in using these two well known types of measuring instruments there is also the potential visual tricks played upon the inspector in reading the setting of the barrel or reading of the vernier scale wherein numbers are transposed. Sometimes it becomes a matter of aligning or reading the degree of coincidence of a pair of lines as to which line is the nearest to the precise reading of the scales. Precision end measuring rods, gage-blocks (also known as Jo-blocks) and like precision measuring members are, or course, well known. The difficultly in using such type of devices is the necessity of accumulating the precise desired quantity of these precision-made measuring members. Dial indicators as measuring tools are also well known; however, their accuracy is again subject to many problems of wear and the maintenance of the gears and movable rack as well as the reading of the dials and the initial setting of the indicator.

In the present invention it is contemplated that a micrometer having a fixed anvil carried by a frame will have a movable anvil which is moved to a closed condition by means of a constant force spring. The operator or user of the micrometer pulls or draws the movable anvil from the fixed anvil so that the piece to be measured is brought between the anvils, after which the movable anvil is released so that is is moved to and against the piece being measured under the influence of the predetermined constant force spring. After the movable anvil has been brought to rest against the workpiece to be measured, an electrical readout visually displays the precise measurement between the fixed anvil and the movable anvil. In gages such as height gages modifications of the frame are made and the same measuring means are provided.

It is, of course, well known to use glass or metal scales to measure the travel of the worktables of machine tools. These scales and other measuring systems are usually fixed in relation to a frame and the scale itself is directly read in relation to the position of the indicating device as it is moved along the bed or table of the machine or work member which is used to measure the amount of travel of the machine tool or workpiece. Such readings do not convert the travel into digital readouts except some of the latest electro-optical linear encoders.

Rack and pinion systems used for driving rotary encoders are known as well as tape systems using a tape drawn around a precision pulley. It is also known to utilize a rotary movement of a precise roller over the face of a machine tool worktable. However, insofar as is known, these systems tend to develop both random and accumlative errors arising from dirt, linear expansion or contraction because of changes in temperature or because of wear or slippage, causing these measuring systems to lose their precision even if the accuracy is initially provided.

In particular, as far as is known, there has been no tape system for a hand held micrometer vernier or height gage using a tape stored in a spring-loaded spool with the tape fed from the spool. Where the rotation of a precision roller is caused by said roller being driven by movement of the roller along the workpiece, this type of system in a micrometer or caliper would require that the workpiece being measured would be free of oil, dirt or a combination thereof. This, of course, cannot be guaranteed although essential in a very precision instrument.

In the present invention the electro-optical digital positioning micrometer, or a height or linear digital gage may utilize a metal or glass fiber tape whose length is closely related to the travel of the movable anvil of the micrometer. Each micrometer indicator is disposed to read the linear travel of the movable anvil. The tape in its determined mounted condition within the frame is brought to a determined tension and during measuring operations is maintained in this condition. The tape is maintained at this tension and in a fixed relation to the frame as the movable anvil is moved to a measuring condition on the workpiece to be measured. The tape and the rest of the movable portions of the micrometers are maintained in a substantially sealed enclosure condition so that the accuracy initially built into the micrometer will be maintained throughout its use and operation.

SUMMARY OF THE INVENTION

This invention may be summarized at least in part with reference to its objects. It is an object of this invention to provide, and it does provide, an electro-optical digital precision micrometer or height gage wherein within a frame, a metal tape is mounted at a determined tension and is moved by the linear travel of a movable anvil. The tape, as it is moved with and by the movable anvil, engages and rotates a precision gage roller which carries on a common shaft an interrupter disc member whose radially arranged lines cut a light beam to cause a photosensor to feed these interruptions as electrical pulses to a digital readout.

It is a further object of this invention to provide, and it does provide, an electro-optical digital micrometer or height gage wherein a metal tape is adjusted and established to operate at a predetermined tension and is attached to a bracket also carrying the precision gage roller so that the tape is moved by the linear travel of the movable anvil at twice the rate of travel of the movable anvil.

An electro-optical digital precision micrometer, in accordance with the above objects and the following description, is shown in several embodiments. Each of these embodiments is disposed to provide a precise readout of one coordinate of movement which corresponds to the movement of the movable anvil of the micrometer. The micrometer may be mounted in a clamp, bracket or the like or as a hand-held tool may be carried around to machine tools or to an inspection bench wherein the workpiece to be measured may be accurately and precisely measured by the digital precision micrometer.

In several embodiments the micrometer utilizes a thin metal tape which is carried to and around a precision gage roller carried on an axle also carrying an interrupter disc having radially arranged lines adapted to "cut" a light beam directed at a pair of photosensors. This interrupted light is fed as electrical pulses to a digital readout. The metal tape has at least one end fixed to the movable frame portion carrying the movable anvil of the micrometer. In one embodiment the other end of the tape is carried by a bracket piece carried on a slide rod. A constant force spring is disposed to urge and maintain the tape at a determined constant for at all points along the measuring path.

In an alternate embodiment a single extent of tape has one end carried by a bracket carrying the movable anvil. From this bracket the tape is directed to and into peripheral engagement with a precision drive roller carrying a first interrupter disc. The tape is then directed around an idler roller thence to a second precision roller carrying a second interrupter disc which is adjacent to and passes by the first disc so that the radial lines of these two interrupter discs are concurrently disposed to interrupt or cut a light beam directed at photosensors wherein these interruptions are fed as electrical pulses to a digital readout. The single extent tape is maintained at a constant tension by means of a constant force spring having one end fastened to the frame of the micrometer.

In yet another embodiment a thin metal tape is carried around two pulleys fixed and fastened to the frame of the micrometer with the ends of the tape being attached to and carried by a bracket which is slidable on rods carried by the frame and is movable with the movable anvil of the micrometer. This tape is carried to and around a pair of pulleys of precision diameter which is fixed to the frame. The movement of the tape rotates the rollers which carry interrupter discs in an overlapped relationship to each other. As the tape is moved it is in peripheral contact with the precision measuring or gage rollers with the tape carried to and around an idler roller disposed between the gage rollers so as to maintain the tape in a determined wrap or engagement with the gage rollers.

In yet another embodiment a tape is carried to and around a pair of fixed rollers carried by the frame of the micrometer. The tape has its ends carried by the movable anvil which also carries a pair of precision gage rollers each carrying an interrupter disc rotated with said rollers. These interrupter discs are arranged in an overlapped relationship to each other and with the tape being directed around the precision gage rollers to an idler roller so that the metal tape is carried in peripheral engagement with and around said precision gage rollers.

In yet another embodiment the tape is carried around rollers mounted in a frame forming a part of a height gage. The movable anvil carries the precision gage roller as well as the ends of the tape.

In addition to the above summary the following disclosure is detailed to insure adequacy and aid in understanding of the invention. This disclosure, however, is not intended to prejudice that purpose of a patent which is to cover each new inventive concept therein no matter how it may later be disguised by variations in form or additions of further improvements. For this reason there has been chosen a specific embodiment of the digital electro-optical micrometer and modifications thereof including a height gage as adopted for use with a digital counter and readout and showning a preferred means for constructing the micrometer with a fixed and movable anvil. This specific embodiment and alternate embodiments thereof have been chosen for the purposes of illustration and description as shown in the accompanying drawings wherein:

BRIEF DESCRIPTION OF THE DRAWINGS

FIG. 2 represents a partly diagrammatic side view showing a digital electro-optical precision micrometer with its side cover removed to show the interior and mechanism in which a single extent of tape is used to drive a single precision gage roller and its mounted interrupter disc;

FIG. 3 represents a partly diagrammatic side view of a precision micrometer with the cover member removed to show the internal mechanism of a precision micrometer in which a single tape has its ends carried by movable members, said tape peripherally engaging and driving a pair of precision gage rollers, each carrying a mounted interrupter disc disposed in an overlapped relationship;

FIG. 4 represents a partly diagrammatic side view of an alternate precision micrometer and with the cover member removed to show the internal mechanism of the micrometer in which the closed loop drive for the optical readout interrupter disc is carried around two rollers fixed to the frame with the ends of the tape attached to and carried by a movable bracket portion disposed to also carry the movable anvil member of the micrometer;

FIG. 5 represents a partly diagrammatic side view of yet another alternate embodiment of a micrometer similar to that of FIG. 4 wherein the precision gage rollers and the mounted interrupter disc are carried on the movable bracket also carrying the movable anvil of the micrometer;

FIG. 6 represents a side view of yet another embodiment of a precision micrometer in which a metal tape is carried around two pulleys which are attached to and are carried by the movable frame portion in turn carried by and moved with the movable anvil member of the micrometer and in which the tape is brought to and around a pair of spaced precision gage rollers and an intermediate idler roller, said rollers being carried by a bracket portion on the frame of the micrometer;

FIG. 7 represents a slightly enlarged isometric view of the components making up the movable anvil and bracket portion of the micrometer of FIG. 6;

FIG. 8 represents an exploded isometric view showing the arrangement of the drive for the two interrupter discs and the precision gage rollers to which they are mounted and also the idler roller as seen in FIG. 6;

FIG. 9 represents a partly diagrammatic side view of yet another embodiment of a micrometer in which a precision lead screw is carried in bearings mounted in the frame of the micrometer and in which a precision nut is carried by a frame carrying the movable anvil which as it is moved causes the precision screw to be rotated;

FIG. 10 represents a sectional view taken on the line 15—15 of FIG. 9 and looking in the direction of the arrows;

FIG. 11 represents an isometric view showing partly fragmentarily the components which make up the movable anvil system and the nut by which it rotates the precision lead screw;

FIG. 12 represents in an enlarged scale the relationship of two interrupter discs as they overlap each other and are each rotated with a precision roller;

FIG. 13 represents a side view, partly diagrammatic, of the micrometer tape system mounted in a height gage frame and using the tape movement to read the movement of the upper finger;

FIG. 14 represents a side view, partly diagrammatic, of an alternate method of mounting a fixed anvil so as to provide, multiple measuring capacities for the micrometer;

FIG. 15 represents a side view partly diagrammatic of the micrometer and showning in particular a pneumatic dash pot mounted in the handle portion;

FIG. 16 represents a sectional side view in enlarged scale of the dash pot of FIG. 15;

FIG. 17 represents a sectional side view in the scale of FIG. 16 of a closed circuit fluid actuated dash pot providing an alternate means of motion speed control;

FIG. 18 represents a diagrammatic sectional view showing yet another pneumatic dash pot control which additionally provides a precision guide means for a movable bracket;

FIG. 19 represents a sectional view of a pneumatic dash pot portion, this view taken on the line 19—19 of FIG. 18 and looking in the direction of the arrows;

FIG. 20 represents a circuit diagram showing the actuation of the pulse generating means so that the digital readout positively adds or subtracts in accordance with the movement of the interrupter member by a pair of photo detectors;

FIG. 21 represents the simultaneous sinusoidal waves of the two photocells as a line is passed in front of them, and FIG. 22 represents the reading of the pulses formed into square waves and the reading of each raising and falling edge of the square wave.

In the following description and in the claims various details will be identified by specific names for convenience; these names, however, are intended to be generic in their application. Corresponding reference characters refer to like members throughout the several figures of the drawings.

Figure 1:
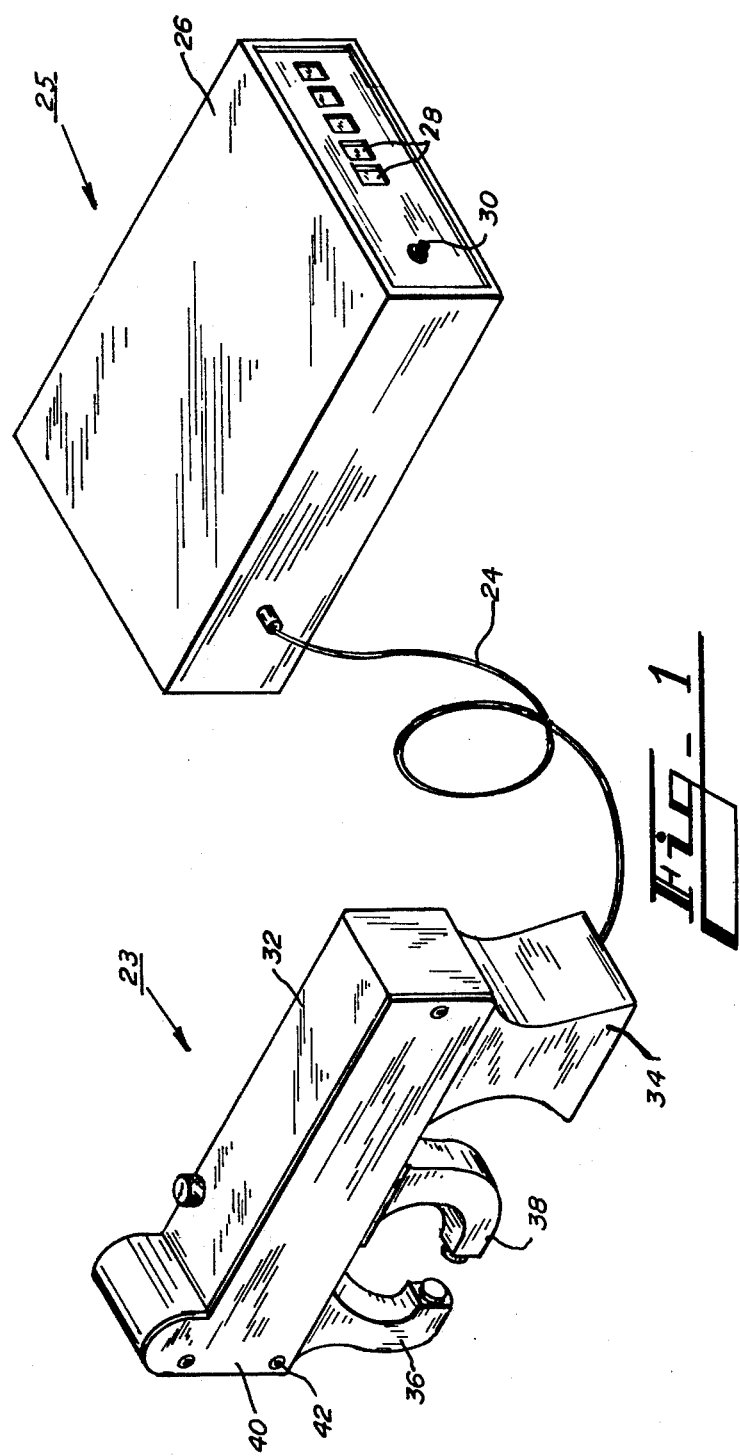
FIG. 1 represents a generally schematic isometric view showing an electro-optical micrometer of this invention as it is connected to a digital readout wherein the measurement of the movable anvil from in its displacement from a fixed facing anvil is displayed on an electrical readout.

The drawings accompanying, and forming part of, this specification disclose certain details of construction for the purpose of explanation of the broader aspects of the invention, but it should be understood that structural details may be modified in various respects without departure from the concept and principles of the invention.

DESCRIPTION OF THE PREFERRED EMBODIMENT

As seen in FIG. 1

Referring now in particular to the drawings there is depicted in FIG. 1 a precision electro-optical micrometer of this invention wherein the micrometer mechanical portion is generally identified as 23. This portion is connected by means of a cable 24 to a digital readout 25. The electrical and electronic components are enclosed in a housing 26 which may or may not have an electrical power source therein. In the digital readout, of course, the front end of the case or cover is provided with numerical displays 28 which preferably are light-emitting diodes (led's) upon which a reading of the micrometer movement is displayed. A reset button 30 is also shown and is contemplated as being used in a conventional manner to erase a reading and reset the display to zero in a generally conventional manner.

Referring now in particular to the micrometer housing and to the mechanism as carried therein, it is to be noted that the housing itself, identified as 32 is a U-shaped housing having a rear handle portion 34. As carried by the frame of this micrometer a forward anvil 36 is fixed to the frame and cooperates with a movable anvil 38 which is carried by the frame and is urged toward the fixed anvil by means of a constant force spring means carried with the housing 32. A side cover plate 40 is removably retained by screws 42 so that the internal portions of this micrometer may be adjusted and serviced. This general arrangement is maintained throughout the several embodiments to be hereinafter more fully described. The movable anvil 38, as it is moved, causes several mechanism to be actuated resulting in electrical pulses which are related precisely to the motion of anvil 38 and are fed to the digital readout 25 for converting the travel extent of the movable anvil 38 into a readout shown by the light-emitting diodes 28.

Embodiment of FIG. 2

Referring next to FIG. 2, there is seen an electro-optical micrometer in which the fixed anvil 36 is carried by a frame 80 which is a modification of the frame 32. In this embodiment there is formed an offset above the handle in which is enclosed a precision tape measuring means. As shown this frame has its cover removed to expose the inside of the apparatus. A movable anvil 38 has its upper end formed with or has attached thereto a movable block 82, which block is carried and slidable upon a pair of guide rods 84 and 85. These rods provide a precision guide means for the movable anvil or bracket as it is moved from the open to a closed position. Bushings or bearings, not shown, are mounted in the block 82 to permit the movable anvil 38 to slide freely and precisely along these guide rods 84 and 85 whose ends are precisely mounted in bores formed in the frame 80. Two constant force springs identified as 55a and 55b are carried by the housing 80 with each having one end of the spring carried by and on a stud 56. The other end of spring 55a is carried by a stud 58 mounted in block 82. Also provided in block 82 is a tape retaining or grip portion 88 in which is mounted a set screw 90 adapted to grip a thin metal or fiber glass tape 92 in a slot formed in block 88.

The block 82 and tape 92 are moved by the movement of the movable anvil 38 as it measures the workpiece generally indicated as 94 and seen in phantom outline and disposed between the fixed and the movable anvils 36 and 38. This tape 92 extends rightwardly from the block 82 to an idler pulley or roller 95 from whence it is directed up and over a precision roller 96 indicated by dotted outline. This roller on its shaft carries an interrupter disc 97 having a sequence of equally spaced radially disposed lines thereon which cut light lines. The tape is then fed downwardly to and around a deflector idler pulley or roller 98 thence to a tape end retaining block 100. This block is slidably carried upon a pair of guide rods 102 retained in bores formed in the bottom wall of the handle portion of the frame 80. The constant force spring 55b has its lower end retained by a post 56 which is fixedly mounted in the frame 80 and a post 58 carries the other end of the constant force spring 55b mounted in the movable retaining block 100.

Embodiment of FIG. 3

Referring next to FIG. 3, there is depicted an electro-optical micrometer similar to that shown and described in FIG. 2 above. In this embodiment the fixed anvil portion 26 is carried upon the end of a frame 110 which has precisely mounted therein a pair of slide rods 112 and 113 which carry a movable block 115 which may be an integral part of or may be attached to the movable anvil 38. This block 115 is carried and is slidable on bearings retained therein and although not shown this block is freely and precisely moved along the rods 112 and 113. A constant force spring 55a has its left end attached to a fixed post 56 attached to the frame 110 while the other end of said constant force spring is attached by means of post 58 to the block 115. A set screw 90, as in FIG. 2, is adapted to engage a tape 118 whose left end is fitted and retained in a slot formed in a grip block portion 120. This end of the tape 118 is movable with the block 115 and the moveable anvil 38. Tape 118 is brought to and is directed around a precision gage roller 122 and then to and around an idler roller 124 thence leftwardly and downwardly, as viewed, around a precision gage roller 126 which deflects or guides the tape 118 toward and to a movable retaining block 130 carried upon a pair of guide rods 132 mounted and retained in the bottom of the handle portion of the frame 110. A constant force spring 55b has one end carried on retaining post 56 fastened to the handle portion of the frame 110 while the other end of the spring is mounted on a post 58 fastened to the movable block 130.

Use and Operation of the Micrometers of

FIGS. 2 and 3

In the electro-optical micrometer of FIG. 2 it is contemplated that the fixed anvil 36 will engage the workpiece 94 to act as a stop as the piece is measured. The movable anvil 38 is drawn toward and to the handle portion of the frame by the operator who then releases this anvil which is then drawn toward the fixed anvil 36 by the constant force spring 55a. As this constant force spring urges the anvil 38 toward and into a determined engagement with the workpiece 94, the tape 92 is caused to be moved around the idler rollers 95 and 98 and around the precision measuring roller 96. As the precision gage roller 96 is rotated it causes the interrupter disc 97 to be rotated in way of light source 66 and a receiver 68, not seen. This interrupter member has a sequence of a multiplicity of equally spaced radially disposed lines thereon. The tape 92 is maintained in a determined tension around the precision gage roller 96 by a constant force spring 55b. The constant force spring 55a has a greater tension so as to overcome spring 55b, whereby in its released state the movable anvil is urged toward and to the fixed anvil 36. Spring 55b provides the desired tension in the tape during all movement of the movable anvil. The set screw 90 is adjusted in block portion 88 to secure the tape in block 82 prior to the operation of the micrometer. A like set screw, not shown, fastens the other end of the tape 92 at the desired tension in retaining block 100. In order to measure the workpiece 94 the movable anvil 38 is drawn toward the handle portion of the micrometer and the workpiece is placed against the fixed anvil 36 after which the movable anvil 38 is released to slide in a precisely guided manner on guide rods 84 and 85 and into engagement with the workpiece 94. The constant force spring 55a, being more powerful than the constant force spring 55b which provides the desired tension to tape 92, insures that in all circumstances the movable anvil 38 is urged toward and into engagement with the workpiece 94. A dash pot or dampening device is provided to insure that the movable anvil 38 advances at a desired rate. This dash pot arrangement may be the same or similar to that shown and discussed in regards to FIGS. 17 and 18, to be hereinafter more fully described.

The electro-optical micrometer of FIG. 3 is similar in all respects to the micrometer of FIG. 2 in that the exerted force in constant force spring 55a is greater than the exerted force in constant force spring 55b. The movable anvil 38, as it is moved, carries the movable support block 115 and attached tape resulting in the movement of the tape 118 to and around the precision gage rollers 122 and 126. These rollers are mounted in shafts which carry like interrupter discs 135a and 135b with the rollers and their mounted discs positioned so that certain peripheral portions of the discs overlap. At this overlapped area a light source 66 is adapted to direct a beam through the two discs with said beam being interrupted by the radial lines formed on each of the discs to cause multiple pulsation signals to be generated at and from a light receiving photosensor system. These discs are sufficiently transparent so that the light beam from light source 66 may pass through a portion of said discs. It is to be noted that, if desired, the blocks 100 and 130 may be deleted and the respective tapes attached directly to a constant force spring 55b which then provides the desired tension to the attached tape.

Embodiment of FIG. 4

Referring next to the electro-optical micrometer of FIG. 4 it is to be noted that the side cover for the housing is removed so that as seen the fixed anvil 36 is carried by a frame 140 which also carries guide rods 142 and 143 disposed to slidably retain in a determined precision alignment a slide block 145. This movable anvil 38 may be formed integral with or may be a separately attached portion of this anvil. A constant force spring 55 is carried at one end by a post 56 fastened in and on the frame 140. On its right end this spring is retained by means of a post 58 which is fastened to the slide block 145 so as to urge the movable anvil 38 to and toward the fixed anvil 36. A thin flexible metal or fiber galss tape 147 is directed to and around an idler or guide roller 148 mounted on the left end of frame 140 and also to a like idler or guide roller 149 mounted on and supported by the right end of frame 140. Rollers 148 and 149 are disposed to support the tape 147 in a precise alignment with the guide rods 142 and 143.

Intermediate these rollers the tape 147 is directed to and around a pair of precision rollers 150 and 152 each carried by the frame 140. An idler roller 154 above and midway of rollers 150 and 152 directs the tape 147 around the two rollers 150 and 152 so that the tape 147 is disposed with at least a ninety degree peripheral engagement of each of the rollers 150 and 152. The rollers 150 and 152 are carried upon shafts which also carry interrupter discs 135a and 135b arranged in an overlapped relationship and which are sufficiently transparent so that light emitting from a light source 66 may simultaneously pass through both discs and by the lines thereon be interrupted as it proceeds to a light receiver 68, not shown. One end of the tape 147 is retained in a slot 156 by means of a set screw 157 and is disposed to enter this slot provided in the sliding block 145. The other end of the tape is retained in a like slot 158 also formed in the block 145. This other end of the tape is secured by means of a set screw 159 which enters the slot to engage the tape drawn to determined tension. This tension is maintained as the movable anvil is manipulated back and forth upon the guide rods 142 and 143.

The tension in the tape 147 may be maintained by making either or both of the bearing shafts for rollers 148 and 149 slidable in the housing or frame 140 and in the direction of the tape. This slidable positioning permits the tape to be adjusted after which the shaft retaining means is locked or secured. This positioning enables the tape tension and position to be easily and precisely established.

Embodiment of FIG. 5

Referring now to FIG. 5, it is to be noted that in this embodiment the electro-optical micrometer depicted is similar to that of FIG. 4. A frame 160 carries a fixed anvil 36 upon its left end and a movable anvil 38 upon slide and guide rods 162 and 163 carried by the frame 160. A support block 165 is slidably carried on these rods by bearings, not shown. The sliding block 165 may be an integral portion of the movable anvil 38 or may be attached thereto. A constant force spring 55 has its left end retained upon a post 56 carried by the fixed frame and has its right end retained by a post 58 carried by and mounted on the block 165. A flexible tape of metal or fiber glass and of a precision thickness is indentified as 170 and is carried by and directed around idler rollers 172 and 173 both rotatably carried by the frame 160. The ends of the tape 170 are carried in retained slots 174 and 175 formed in post portions of the block 165. Set screws 176 and 177 are carried in these post portions and are adapted to be tightened to enter the slots to clamp the tape in a fixed condition and tension in the block 165. Also carried upon this block are precision gage rollers 180 and 181. These rollers are peripherally engaged by the tape 170 as it is directed around about a quarter of the periphery of each precision gage roller and then to and around an idler roller 183 disposed intermediate and below the precision gage rollers. Also carried by and on the rotatable shafts carrying the rollers 180 and 181 are interrupter discs 135a and 135b which are disposed in an overlapped relationship so that where they overlap and pass by each other a beam from light source 66 passes through these discs and by the lines thereon is interrupted as it is received by a light receiver 68, not shown. This arrangement is similar to that in FIG. 4, above-described.

The tension in the tape 170 may be maintained by making either or both shafts for rollers 172 and 173 slidable in slots in the frame 160 in a manner similar to that described in FIG. 4 above.

Use and Operation of the Micrometer of FIGS. 4 and 5

The micrometers of FIGS. 4 and 5 have each of their tapes arranged so that as the movable anvil 38 is moved toward or away from the fixed anvil the tape is moved. In the embodiment of FIG. 5 the tape moves around the precision rollers at twice the rate of the movable anvil 38. In the arrangement of FIG. 4 as the anvil 38 is moved back and forth the rollers 150 and 152 are rotated by the movement of the tape which in FIG. 4 is moved the same determined distance as the movable anvil is moved causing the rollers 150 and 152 to be rotated. As they rotate the light beam passing through the overlapped disc 135a and b is interrupted by the lines thereon so that signals from the receiver cause a determined pulsation which is amplified and fed to the readout. In FIG. 5 the tape 170 is moved at twice the speed of the movable anvil 38 causing the tape as it passes around the precision gage rollers to cause the interrupter discs to be rotated at double speed. As the movable anvil and block 165 is moved along the rods 162 and 163 the discs 135a and b are rotated to cause the light beam as it is directed from light source 66 to be interrupted by the overlapped portions of discs 135a and b with the resulting pulsations through the two discs received by the light receiving source being four times the rate of travel of the movable anvil.

In the embodiments of FIGS. 4 and 5 as in all the other electro-optical micrometer systems it is desired that the tape and frame have the same coefficient of thermal expansion. This is particularly true in those systems where both ends of the tape are retained by the same block as in FIGS. 4 and 5. It is also to be noted that FIGS. 4 and 5 need not have two overlapped interrupter discs rotated in overlapped relationship by spaced like precision rollers. Instead a single roller and disc may be utilized as in FIG. 2 but without the constant force spring.

Micrometer of FIGS. 6, 7 and 8

Referring now to the electro-optical micrometer as seen in FIGS. 6, 7 and 8 wherein a tape 190 is carried by rollers 192 and 193 which are idler rollers mounted upon a movable frame 195. This frame is fastened to the movable anvil 38 which preferably has its upper end 197 made as an integral part of the anvil. A pair of guide rods 199 and 200 providing a precision guide means for movable frame 195 are carried in precise alignment in and by frame 202. A constant force spring 55 similar to all the other, above noted, constant force springs has its left end carried upon a fixed post 56 carried by and affixed to the frame 202. The right end of this spring is mounted on a post 58 mounted upon the block 197. The tape 190 has its ends retained in slots 204 and 205 by set screws 207 and 208 formed and carried in the block 197. This tape is maintained in determined tension by means similar to that in FIGS. 4 and 5 above as it is fed to and around precision rollers 210 and 212 carried by the frame 202. The extent of tape 190 extending between the precision rollers 210 and 212 is directed upwardly to and around an intermediately disposed idler roller 214 carried upon a fixed portion of the frame 202. Interrupter discs 135a and b are carried upon the rotatable shafts carrying the rollers 210 and 212. These rollers and shafts are disposed so that at one particular position the discs are overlapped as in FIG. 12 and at this overlapped position are placed in way of a light source 66 which passes through both discs so that the lines thereon interrupt the beam received by a light receiving source 68 not in this FIG.

Use and Operation of the Micrometer of FIGS. 6, 7 and 8

The micrometer of this embodiment, in operation, has the movable anvil 38 disposed to be moved from the fixed anvil 36 against the pull of the constant force spring 55. The frame 195 with the idler rollers 192 and 193 thereon is moved at this same determined speed and distance so that the upper extent of the tape 190 between the rollers 192 and 193 is moved as the movable anvil is moved. The extent of tape 190 also moves to and around rollers 210 and 212 to cause the precision gage rollers 210 and 212 to be rotated in direct relation to the travel of the tape. As these rollers are rotated both interrupter discs 135a and b are rotated to cause the beam of light passing through this overlapped portion of these discs to be interrupted in a determined relationship to the movement of the tape.

Micrometer of FIGS. 9, 10, 11 and 12

Referring next to the electro-optical micrometer as shown in FIGS. 9, 10, 11 and 12, it is to be noted that in a fixed frame 220 is rotatably retained a precision lead screw 222 carried in bearings 224 and 225 so that the screw is in a fixed axial relationship to the frame 220 while being maintained in a freely rotatable condition. A fixed anvil 36 and a movable anvil 38 are disposed to engage workpiece 94 in a manner similar to the other embodiments above-described. A slide bracket 228 is carried upon the upper portion of the movable anvil 38. This bracket may be integral with the anvil or be removably attached. Fixedly carried in this bracket is a ball nut 230 which is mounted upon the screw 222 and causes the screw 222 to rotate as the movable anvil and ball nut 230 move back and forth along the screw. A constant force spring 55 like those above-described has its left end carried by fixed post 56 fastened to the frame 220. The right end of the spring is retained by a post 58 carried by the bracket 228 portion of the movable anvil 38. A guide rod 232 is fixedly retained in the frame 220 and as mounted is aligned with the screw 222 to provide a positive guide for the travel of the movable anvil 38. Carried on the right end of the screw 222 is an interrupter disc 135 which is disposed so that the radial lines thereon pass into cutout 70 in bracket 64 so as to interrupt the beam of light from source 66 as it is received by the photosensors 68.

Use and Operation of the Micrometer of FIGS. 9, 10, 11 and 12

In operation the movable anvil 38 of the micrometer of FIGS. 9–12, as it is drawn from the fixed anvil 36, carries the ball nut 230 which as it is moved engages the screw 222 and by the pitch of the thread causes the screw to rotate. As the screw is rotated the interrupter disc 135 is also rotated. The lines on the rotated interrupter disc cause the beam of light from source 66 to be cut and the receiving photosensors 68 convert these to electrical pulses. As the movable anvil is moved back and forth on rod 232 against the constant force of the spring 55 the precision screw 222 is rotated as well as the mounted interrupter disc 135. The resulting determined number of pulses is converted to signals displayed on the readout 25.

Height Gage of FIG. 13

Referring next to FIG. 13 and, as shown, the somewhat diagrammatic representation of a height gage in which there is provided a base 250 to which is attached an upright frame 252. This frame is formed with slots 254 and 255 disposed on the front and rear portions of the upright frame 252. Although not shown, flexible seals may be provided at these slots to slidably engage outwardly extending portions, to be hereinafter described, which portions are moved along and in these slots. To the right of the frame and through slot 254 extends a movable finger member 258 which provides the means to establish the upper engaging determination of the height gage. Depicted also is a roller guide means 260 which extends through slot 255 and includes opposed or spaced pairs of upper and lower rollers which support gage support block 262 as it is moved up and down the frame. On and in this block is carried a pair of idler or guide rollers 264 and 265 which engage and guide a tape 267 to and around a precision gage roller 268 which as in the micrometer assemblies, above shown, carries an interrupter disc, not shown.

Upper and lower support pulleys 270 and 271 are rotatably supported in the inner ends of frame 252 and carry the tape 267 as in the manner of the pulleys 172 and 173 shown in the micrometer disclosed in FIG. 5. And as with the micrometer tape system of FIG. 5 the ends of the tape 267 are secured in slots formed in block 262. The desired tension in the tape may be established by moving either pulley 270 and 271 outwardly in a slot means, not shown, or by adjusting the tape as it is gripped in the slots provided in block 262. As in the tape system shown in FIG. 5, except that only a single precision roller is illustrated, the tape and the precision roller are driven at twice the rate of movement of block 262 and attached measuring finger member 258.

Use and Operation of Height Gage of FIG. 13

In use, the height gage in FIG. 13 anticipates that base 250 will be placed upon and supported by a precision flat surface (surface plate) as used for and with conventional height gages. After the gage has been positioned on the surface means the finger member 258 is brought to the precision surface to establish a zero height or may be set at a higher elevation by a precision known gage such as a jo-block. From this established datum height or bench mark the finger 258 is raised and the workpiece to be measured is placed on the support surface and under the finger 258 which is then lowered to a measuring engagement of the workpiece in the conventional manner. The movement of the finger 258 causes a like movement of the block 262 which moves tape 267 and the precision roller 268 which rotates an interrupter disc to create electrical pulses which are computed by the circuit and readout 25 as in the case of the micrometers above-described. Other tape systems using one or two interrupter discs; the lead screw system of FIG. 14 may, of course, be used to make a height gage similar in function to the one shown.

Alternate Fixed Anvil of FIG. 14

Referring next to FIG. 14 there is depicted an alternate construction of a fixed anvil wherein a frame 280 has its left or outer end precisely formed so that against a seating surface 282 a removable fixed anvil may be mounted. Below this surface 282 a tongue member 284 has a stop shoulder 285 from which a male tongue portion 287 extends leftwardly. This tongue portion is shown in dashed outline. A dowel hole 289 and a tapped hole 290 are also formed and provided in the end face of frame body 280.

A removable fixed anvil 292 is provided with a dowel 294 and a thumb screw 296. The dowel enters hole 289 and thumb screw 296 enters and engages the threads in tapped hole 290. A female groove 298 formed in the lower portion of anvil 292 slidably engages tongue 287 so that when screw 296 is tightened the anvil 292 establishes the fixed contact point for measuring the workpiece. As the mechanical travel of the micrometer is only slightly more than a determined distance such as 1 inch, anvils establishing other fixed contact points may be provided for these other capacities. For this reason it is contemplated that another removable fixed anvil 300 be constructed like anvil 292 except that the frame is constructed so that the pin 299a is positioned precisely one inch to the right of pin 299 provided in the mounted anvil 292.

Other anvils which may be designed to carry a pin which is like pin 299, are made with their frame disposed to carry the pin progressively 1 inch further left than the pin 299 in anvil 292. For example, assuming that anvil 300 is the anvil for a zero to 1 inch measuring movement, and anvil 292 provides the next measuring movement step of 1 inch to 2 inch measurement capacity then other anvils can be formed to provide the 2-to-3 inch measurement; 3-to4 inch measurement, etc. The increments of measurement and design, of course, is merely a matter of selection and maybe adapted to each of the micrometers above shown and described.

Dash Pot System of FIGS. 15-17

Referring next to FIGS. 15, 16 and 17, there are depicted two dash pot systems one of which must be employed in the micrometer to insure that a tape such as 92 in the embodiment of FIG. 2 is moved only at a speed which is sufficiently slow to insure that each of the lines on an interrupter disc is detected by photosensors 68. As seen in FIG. 15, a pneumatic open system has a plunger or piston 60 carried in a cylinder 400 which has a closed end 402. This end may be an integral part of the cylinder or, if desired, may be an inserted disc. The other end of the cylinder is closed by end disc 403 which carries rod 62. Seal 404 prevents or limits the flow of air along rod 62. Passageways 406 and 407 through ends 402 and 403 are selectively restricted as to the flow of air by means of adjusting screws 408 and 409. Seals 410 are conventionally carried by piston 60 to insure no unwanted leakage past the piston. The maximum rate of movement or speed of travel of the tape is adjusted to suit the ability of a pair of photosensors 68 to detect the cutting of the beam of light. The constant force spring 55 pulls the movable anvil 38 toward fixed anvil 36. Counterflow or outward movement of the movable anvil is achieved by the operator of the instrument by exerting a force against the constant force spring.

System of FIG. 17

In FIG. 17 is depicted a closed hydraulic system similar to that of FIG. 16 but employing a liquid rather than air. The outer cylinder 400, instead of the open passageways found in ends 402 and 403, has fluid-tight connections to conductors 412 and 413. An adjustable flow restrictor means 415 is shown as placed in conductor 412. A pressure accumulator 417 may also be provided as a connection means for conductors 412 and 413.

In operation the movement of the movable anvil 38 causes a like movement of piston 60. The rate or speed of travel of the associated tape is adjusted by restricting the rate of fluid transfer from the front to the rear of the cylinder 400. Accumulator 417 insures a constant pressure in the system.

System of FIGS. 18 and 19

Referring next to FIGS. 18 and 19, there is figuratively shown an alternate dash pot system in which air is used. In this system opposed open-ended dash pots are adapted to provide a guide path for the movable anvil. This arrangement may eliminate or reduce to a certain extent the dependence on precision guide means such as guide rods. Housings 420 and 422 are shown as substantially square or rectangular in cross-sectional configuration. The inner corners of these housings are rounded for manufacturing economies. The end closing portions 424 and 426 of these housings have small passageways 428 which are so sized as to restrict or limit the flow of air therethrough to a desired amount.

Pistons 430 and 432 are slidable in housings 420 and 422 and are fixed to a common rod 434. Fixed to the midportion of this rod 434 is a bracket 436 which carries the tape member. Bracket 436 is connected to and is positively moved with the corresponding movement of anvil 38. The dash pot arrangement, as shown in FIGS. 18 and 19, not only controls and limits the speed of travel of the movable anvil and associated tape but also provides the means for establishing the travel path of the tape and movable anvil 38.

Operation of Dash Pot Systems

Although modern electronic sensors would permit the tape member to be moved at a rate of travel in excess of one hundred inches per second, a rate of travel of 1 inch per second permits much smaller and less expensive light beam sensing components including the interrupter disc. The dash pot not only establishes this limit but also as in a shock absorber prevents or severely limits an unwanted bounce action or a released movable anvil as moved by the constant force spring.

Sensing the Direction of Motion
as in FIGS. 20, 21 and 22

Referring next to FIGS. 20, 21 and 22, there is diagrammatically shown a preferred means for a positive sensing of the direction and of the counting the pulses achieved as the tape causes the interrupter disc to rotate. Two or more photocells are optically aligned to produce two 90° phase-shifted sinusoidal waves each time an engraved line is passed in way of a light beam. As seen in FIG. 21, the line 440 depicts the wave pattern as read by a photocell A as seen on an oscilloscope. The line 442 depicts the wave pattern as read by a photocell B of the same engraved lines as they are passed by a photocell. Each wave pattern read by photocell A is repeated by photocell B except that the waves depicted by line 440 are 90° ahead or behind line 442. These two sine waves are next converted into square waves by a circuit known as Smitt Trigger (commercially available integrated circuit such as Texas Instrument's SN7413). The obtained ninety degree phase-shifted square waves are depicted as lines 444, 445, 446 and 447. If the interrupter disc is moving clockwise for instance, as in FIG. 2, the movable anvil is away from the fixed anvil the squared output of the photocell of line 444 is leading the squared output of the other photocell represented by line 446. If the disc is moving counterclockwise for instance, or as in FIG. 2, the movable anvil is toward the fixed anvil, the squared output of the photocell A is represented by line 445 is trailing the squared output of the second cell B depicted by line 447. A circuit known as "phase discriminator" senses which photocell output is the one which leads the other and actuates a steering circuit accordingly. The function of this circuit is described hereinafter in respect to the circuit of FIG. 20.

A circuit known as "one-shot multi-vibrator" is used to differentiate the two square waves. This circuit is commercially available and such a unit as an integrated circuit is available from Texas Instrument's (SN74123). The result of the differentiation provides a separate pulse for each raising and falling edge of the two square waves. These pulses are represented as lines 450, 451, 452 and 453. These pulses are summed or added as indicated by lines 456 and 457.

The phase discriminator's message arrives at a direction steering circuit before the pulses do because of a delay circuit as shown in FIG. 20. By the circuit shown in FIG. 20, no pulses are missed and they go into the correct forward or reverse counting circuits.

Circuit of FIG. 20

An encoder 460 is used with each interrupter disc or overlapped pair of discs and contains the light sources and the optically aligned photocells. The waves 440 and 442 are fed to the Smitt triggers 462 and 464 where they are converted to square wave forms 444 and 446. The signal output of Smitt triggers 462 and 464 are also fed to a phase discriminator 466 and from this discriminator to a direction steering circuit 468. The square wave signal 444 is fed to a differentiator 470 which reads each raise and fall of a pulse and as pulse signal 450 sends it to a delay 472 thence to the direction steering circuit 468. The square signal 446 from Smitt trigger 464 is fed to differentiator 474 which reads each raise and fall of a pulse and as signal 451 sends it to a delay 476 and thence to the direction steering circuit 468.

The principles shown in the block diagram of FIG. 20 are those used in pulse reading and counting systems where forward and reverse are detected and strictly accounted.

In the above shown and described embodiments, particularly those showing the hand-held micrometers, the anvils are depicted as disposed to accomplish and accommodate outside measurements of workpieces. As inside measurements are as important as outside measurements, anvils having ball contacts facing outwardly may conventionally be provided to engage inside diameters and other inside measurements to provide precise "inside" measurements of workpieces. Such anvils may be provided for all the above measuring apparatus.

As all of the above apparatus provide and utilize an interrupter disc having lines thereon which cut a beam of light it is necessary that the speed of the back and forth travel of the movable member be so controlled that the interruptions in the beam by each passing line is read by the photosensor. Accordingly, a dash-pot type of dampening is provided on each apparatus so that possible errors do not occur through incomplete electrical response to the interrupting of the beam. Other speed checking means may be provided but whatever system is used it is very necessary that the speed of the movable member be controlled in both its forward and its return movements.

It is also contemplated that a single light beam may be utilized to provide dual pulses read by two or more photosensor systems. For example, the disc may be sufficiently transparent for the light beam to pass through said disc while at the same time the opaque lines carried thereon may be made reflective so that the interrupted or cut beam during the time it is blocked from a direct path photosensor will be reflected to yet another photosensor. Both photosensor systems are then actuated to produce pulses which are fed to the readout computer system to provide additional pulse patterns enabling a finer measurement to be computed.

The pitch of the screw used in the above embodiments, of course, must be sufficiently fast to cause the screw or nut to drive the mating member. Usually this pitch, depending on the diameter of the screw is less (or faster) than the pitch of the national coarse series of thread standards. In smaller sizes the pitch is preferably even greater, for example, a screw thread of one-quarter inch, then threads per inch has been used for the micrometer of FIG. 9. These screws and their bearing retaining means may use a constant load spring to urge the screw to and against a bearing stop if such is deemed necessary. In any circumstance, end play in the screw and/or the nut must be as near zero as is possible and practical.

The electro-optical interrupter system of this invention as applied to precision measuring requirements provides means for making a precision stop or control mechanism as built-in control or controls for motions, positioning and other operations of certain manufacturing equipment. The pulses generated may be used with electronic controls to provide ultra precision control of modern manufacturing equipment.

It is to be noted that the several above-described embodiments exemplify a maintaining of the tapes at a determined tension as in the embodiments of FIGS. 4, 5, 6 and 13. This tension is provided by attaching the ends of the tape to a constant force spring which is then carried by the support block which now retains the ends of the tapes in slots.

Terms such as "left", "right", "up", "down", "bottom", "top", "front", "back", "in", "out", "clockwise", "counterclockwise" and the like are applicable to the embodiments shown and described in conjunction with the drawings. These terms are merely for the purposes of description and do not necessarily apply to the position in which the several micrometer embodiments and height and linear gages may be constructed or used.

While particular embodiments and alternate embodiments have been shown and described it is to be understood the invention is not limited thereto since modifications such as the above suggested may be made within the scope of the accompanying claims and protection is sought to the broadest extent the prior art allows.

What is claimed is:

1. A digital electro-optical measuring micrometer, in which the measurement is precisely determined and initiates electrical pulses fed to a digital readout, said micrometer including: (a) a U-shaped housing transportable to a point of measurement and within which all mechanically movable elements used to derive the precise measurement are carried, said housing further including a fixedly supported anvil; (b) a movable anvil including a movable bracket slidably carried by and on a precision guide means supported by the housing and providing for movement toward and away from the fixedly supported anvil, said guide means disposed within the housing so that the movable anvil is precisely movable along a prescribed path and distance which is at least a standard unit of measurement; (c) a constant force spring attached at one end ot the housing and at the other end to the movable bracket so as to urge the movable anvil from the maximum open condition and toward the fixedly supported anvil and with said constant force applied at all intermediate positions therealong; (d) a tape of relative thinness, this tape carried for movement within the housing by rollers carried by the fixed housing and with at least one end of the tape being secured to the movable member and moved with and by the movable anvil as it is moved, this movable tape being in a driving contact with a precision gage roller carried on a rotatable shaft with and with this roller and shaft beng rotated as the tape is moved thereover; means for maintaining the tape at a determined tension and for providing a corresponding rotational movement of the roller; (e) a rotary disc-like interrupter member carried by and on the shaft on which is mounted the precision gage roller, said interrupter member precisely rotated with the movement of the tape and in response to the movement of the movable anvil against and with the bias of the constant force spring, said interrupter member having a sequence of equally spaced radially disposed lines thereon and in which the tape is also carried in a guide path and maintained in a prescribed alignment by means of first and second idler rollers with one idler roller arranged on each side of the tape path to and from the precision gage roller to provide a wrap around this roller of at least one-quarter of the circumference of said precision gage roller; (f) an encoder including a directed light source and at least a pair of photosensors carried by and as a part of said encoder, each photosensor adapted to receive a narrow beam of light from said source with said beam and photosensors arranged so that the lines of the radial interrupter member interrupts the beam of light as the interrupter member is moved, said interruptions as read by the photosensor being converted to electrical pulse signals; (g) a dash pot having a piston connected to the movable anvil and movable in said dash pot, said piston movable by and with the movement of the movable anvil and having throttling means for establihsing the maximum rotational speed of the interrupter member and the associated movable anvil in either of the two directions of movement to prevent bounce and to establish a sufficiently slow rate of the movement of the anvil whereat and whereby each and every interruption of the beam of light is distinctly read by the photosensors to insure that each and every line on the rotating interrupter member as it interrupts the beam of light converts said interruptions to an electrical pulse signal, said pair of photosensors being optically aligned so as to produce substantially simultaneously phase-shifted waves and pulses each time a line interruption occurs and to feed this information to a discriminator circuit which ascertains from this information the direction of travel at that instant of time, and (h) a digital counter and read-out adapted to receive said electrical signals and convert said pulse signals to information which is fed to converting apparatus with said information corresponding to the precise linear position of the movable member.

2. A digital electro-optical measuring apparatus as in claim 1 in which the disc is sufficiently transparent so that the light beam from said light source may pass through a portion of said disc and the radial lines inscribed thereon are opaque so as to interrupt the beam of light when said lines are passed.

3. A digital electro-optical micrometer as in claim 1 in which the movable support bracket carries one end of the thin tape which has its other end carried by and retained by a second constant force spring means exerting less force than the first constant force spring means urging the movable anvil toward the fixed anvil.

4. A digital electro-optical micrometer as in claim 1 in which the movable support bracket carries one end of the thin tape which has its other end carried by and retained by a second constant force spring which second spring exerts less force than the first constant force spring urging the movable anvil toward the fixedly supported anvil, and in which the rotary interrupter member includes a pair of discs each carried on a shaft carrying a precision roller carried by the housing, said tape being directed to and around said pair of precision rollers so as to engage and rotate said rollers as the movable anvil is moved.

5. A digital electro-optical micrometer as in claim 4 in which the precision rollers are arranged so that the discs carried thereon have a determined portion of their peripheral portions disposed in an overlapped relationship and at this overlapped position the light beam from the light source is directed to and through each of said interrupter discs to a pair of photosensors, the lines on each of said interrupter discs interrupting the light so as to provide double the number of pulses, said tape being guided and retained in engagement with the precision rollers by an idler roller disposed to engage and maintain the tape in a prescribed path intermediate its engagement and drive of the precision rollers.

6. A digital electro-optical micrometer as in claim 1 in which the movable support bracket carries and retains both ends of the precision flat tape maintained at a determined tension and directed to and around about half of each of a pair of spaced guide rollers from whence the tape is directed to and partly around at least one precision gage roller which is rotatably carried on a shaft carried by the frame.

7. A digital electro-optical micrometer as in claim 6 in which there is provided a pair of precision gage rollers each carrying an interrupter disc, said rollers being arranged so that the discs carried thereon have a certain portion of their peripheral portions disposed in an overlapped relationship and at this overlapped position the light beam from said light source is directed to and through said discs to photosensors, said tape being guided and retained in engagement with the precision gage rollers by an idler roller disposed to engage and maintain the tape in a prescribed path intermediate its engagement and drive of the precision gage rollers.

8. A digital electro-optical micrometer as in claim 1 in which the movable support bracket carries and retains both ends of the tape which is of precision thickness and maintained at a determined tension as it is directed to and around about half of each of a pair of spaced guide rollers rotatably supported on a shaft carried by said frame, and from said guide rollers said tape is directed to and partly around at least one precision gage roller rotatably carried on a shaft carried by said movable bracket.

9. A digital electro-optical micrometer as in claim 8 in which there is a pair of precision gage rollers each carried on a shaft rotatably mounted in the movable bracket with each precision gage roller shaft carrying an interrupter disc, said rollers being arranged so that the discs carried thereon have a certain portion of their peripheral portions disposed in an overlapped relationship and at this overlapped position the light beam from the light source is directed to and through said discs to said pair of photosensors, said tape being guided and retained in engagement with the precision gage rollers by an idler roller disposed to engage and maintain the tape in a prescribed path intermediate its engagement and drive of the precision gage rollers.

10. A digital electro-optical micrometer as in claim 1 in which the movable support bracket carries and retains both ends of the tape which is of precision thickness and maintained at a determined tension, and with the movable support bracket further carrying a pair of spaced guide rollers rotatably supported on shafts carried by said support bracket and from said guide rollers the tape is directed to and partly around at least one precision gage roller rotatably carried on a shaft rotatably mounted on the frame.

11. A digital electro-optical micrometer as in claim 10 in which there are a pair of precision gage rollers each carried on a shaft rotatably mounted on the frame with each precision gage roller shaft carrying an interrupter disc, said rollers being arranged so that the discs carried by the precision gage roller shafts have a certain portion of their peripheral portions disposed in an overlapped relationship and at this overlapped position the light beam from the light source is directed to and through the overlapped portion of said discs to a pair of photosensors, said tape being guided and retained in engagement with the precision gage rollers by an idler roller disposed to engage and maintain the tape in a prescribed path intermediate its engagement and drive of said precision gage rollers.

12. A digital electro-optical micrometer as in claim 1 in which the fixedly supported anvil is made so as to be selectively removable and replaceable, the frame of said micrometer having a precision guide and alignment means by which a compatible alignment means is formed on each of a plurality of fixedly supported anvils to provide means for their precise retention on the frame, each fixedly supported anvil in a mounted condition providing a stop surface a precise distance from the stop surface of a like-mounted but different fixedly supported anvil.

* * * * *